3,188,216
GLASS CONTAINING STRONTIUM AND
GALLIUM COMPOUNDS
Carl David Southernwood Burton, Windle, St. Helens, and Alexander Mailer Reid, St. Helens, England, assignors to Pilkington Brothers Limited, Liverpool, England, a corporation of Great Britain
No Drawing. Filed Nov. 6, 1962, Ser. No. 235,884
Claims priority, application Great Britain, Nov. 6, 1961, 39,681/61
13 Claims. (Cl. 106—47)

This invention relates to glass which will transmit a substantial proportion of electromagnetic radiations of a wavelength of 6.5 microns.

The commercially used glasses which are based on the oxides of various elements are not capable of transmitting any substantial proportion of electromagnetic radiations of wavelength greater than about 6 microns and, in fact, cut off at wavelengths of approximately 6.5 microns. There have been suggested in the literature glasses based on materials such as sulphides, tellurides and selenides which will transmit a substantial proportion of electromagnetic radiations of wavelength greater than 6.5 microns, but all these glasses have low softening points, that is to say, below 300° C., so that they are not suitable for many applications. In fact the only glass which is in commercial production and which will transmit a substantial proportion of electromagnetic radiation of wavelength 6.5 microns, and even up to 12 microns, is believed to be a glass based on arsenic sulphide, and the softening point of this class is of the order of 195° C.

It is a main object of the present invention to provide a glass which will transmit a substantial proportion of electromagnetic radiations of wavelength 6.5 microns, and which has a much higher softening point than has heretofore been obtained in such glasses.

A glass manufactured according to the present invention is characterised by having a softening point above 300° C. and being capable of transmitting a substantial proportion of electromagnetic radiations having a wavelength of 6.5 microns and higher wavelengths.

More particularly a glass manufactured according to the present invention is characterised by having a softening point above 650° C. and being capable of transmitting a substantial proportion of electromagnetic radiations having a wavelength of 6.5 microns and higher wavelengths.

In accordance with the present invention it is found that a glass containing by weight from 0.66 to 1.13 parts of gallium oxide ($Ga_2O_3$) to one part of strontium oxide (SrO), the said gallium and strontium oxides constituting at least 50 percent by weight of the glass, has a softening point above 650° C. and will transmit a substantial proportion of electromagnetic radiations of wavelength 6.5 microns.

Conveniently a glass according to the present invention is obtained by the fusion of a batch composition containing the gallium and strontium oxides in proportions which will yield the desired ratio of these oxides in the product glass obtained after fusion.

It will be appreciated that the materials included in the batch composition may be the oxides of strontium and gallium, or alternatively salts of those elements which yield the oxides on heating, for example, the carbonates or nitrates. Preferably the composition contains gallium in the form of gallium oxide and strontium in the form of strontium carbonate.

Other glass-forming components may be contained in the glass in order to modify the physical properties of the glass. In particular, lead oxide has a beneficial effect on transmission and modifies the refractive index of the glass, and accordingly the invention further comprehends a glass containing up to 45% by weight of lead oxide (PbO).

Also in accordance with the present invention, the glass may contain as further components in addition to the strontium and gallium oxides, up to 35% by weight of the oxides of one or more of the elements lithium, sodium, potassium, calcium and magnesium.

Furthermore, the glass may contain up to 40% by weight of the oxides of one or more of the elements copper, zinc, cadmium, lanthanum, titanium, zirconium, thorium, germanium, tantalum, arsenic and antimony.

According to one aspect of the invention, the glass may have a proportion of one or both of the strontium oxide or the gallium oxide replaced by a corresponding molar quantity of the fluoride of the same element.

The invention also comprehends a strontium gallate glass obtained by the fusion of a batch composition consisting essentially of strontium oxide (SrO) and gallium oxide ($Ga_2O_3$).

The invention further comprehends a strontium gallate glass obtained by the fusion of a batch composition consisting essentially of strontium and gallium salts which yield the respective oxides (SrO and $Ga_2O_3$) during the heating process.

The strontium gallate glass may be used itself as a glass having the properties according to the invention, or alternatively the strontium gallate may form any proportion above 50% by weight of the glass.

Glass according to the present invention is made by fusion of a batch containing glass-forming components in proportions which will give rise to a glass of the desired composition followed by subsequent manipulation by techniques well known in the manufacture of optical glass.

The following is given as a specific example of a manner of producing a strontium gallate glass according to the present invention, which glass is capable of transmitting a substantial proportion of electromagnetic radiations of wavelength 7 microns and having a softening point in excess of 650° C.

A glass batch having the composition of 7.5 grams SrO and 7.5 grams $Ga_2O_3$ was heated in a platinum crucible in an electric furnace at a temperature of 1425° C. until the batch was completely fused. The temperature of the furnace may be varied, for example, from 1400° C. to 1450° C. and for small mouldings of the order of 15 grams, it is found that complete fusion takes approximately 15 minutes. The batch was then stirred with a platinum stirrer for half an hour in order to facilitate complete inter-mixing and reaction of the batch components. In order to cool the glass, the molten batch is cast into a mould previously heated to 650° C. and is cooled down slowly from a temperature of 650° C. to room temperature, for example at 1.5° C. per minute.

It is found that strontium gallate glass made by this method has a wide absorption band in the region of 2.7 microns. In cases where it is desired to reduce this absorption band around 2.7 microns, a proportion of either the strontium oxide or the gallium oxide or both, for example, 14.2% by weight is replaced by a corresponding molar quantity of the fluoride of the same element. However, for complete removal of this absorption band, it is necessary for the strontium gallate glass, preferably containing a proportion of the fluoride of one or both of the strontium and gallium, to be melted in a vacuum. Either the batch can be initially fused under a vacuum, or alternatively the glass may be subsequently reheated to a temperature above its softening point under a vacuum.

In order that the present invention may be more fully understood, there are given, by way of illustration, the following examples of the batch composition used in the manufacture of glasses according to the invention, the composition of the glass obtained in each example being also shown.

*Example 1*

Batch composition, grams:
- $Ga_2O_3$ ------------------------------------------------ 3.0
- $SrCO_3$ ------------------------------------------------ 4.5
- $GeO_2$ ------------------------------------------------- 0.2
- $PbF_2$ ------------------------------------------------- 0.2

Glass composition (weight percent):
- $Ga_2O_3$ ----------------------------------------------- 45.8
- $SrO$ -------------------------------------------------- 48.0
- $GeO_2$ ------------------------------------------------ 3.1
- $PbF_2$ ------------------------------------------------- 3.1

*Example 2*

Batch composition, grams:
- $Ga_2O_3$ ------------------------------------------------ 2.0
- $SrCO_3$ ------------------------------------------------ 3.0
- $PbO$ -------------------------------------------------- 3.0

Glass composition (weight percent):
- $Ga_2O_3$ ----------------------------------------------- 28.2
- $SrO$ -------------------------------------------------- 29.6
- $PbO$ -------------------------------------------------- 42.2

*Example 3*

Batch composition, grams:
- $Ga_2O_3$ ------------------------------------------------ 3.0
- $SrCO_3$ ------------------------------------------------ 4.5
- $ZnF_2$ ------------------------------------------------- 1.0

Glass composition (weight percent):
- $Ga_2O_3$ ----------------------------------------------- 42.0
- $SrO$ -------------------------------------------------- 44.0
- $ZnF_2$ ------------------------------------------------ 14.0

*Example 4*

Batch composition, grams:
- $Ga_2O_3$ ------------------------------------------------ 3.0
- $SrO$ -------------------------------------------------- 3.0

Glass composition (weight percent):
- $Ga_2O_3$ ----------------------------------------------- 50.0
- $SrO$ -------------------------------------------------- 50.0

*Example 5*

Batch composition, grams:
- $Ga_2O_3$ ------------------------------------------------ 60.0
- $SrCO_3$ ----------------------------------------------- 100.0

Glass composition (weight percent):
- $Ga_2O_3$ ----------------------------------------------- 46.1
- $SrO$ -------------------------------------------------- 53.9

*Example 6*

Batch composition, grams:
- $Ga_2O_3$ ------------------------------------------------ 45.0
- $SrCO_3$ ------------------------------------------------ 75.0
- $PbO$ -------------------------------------------------- 30.0

Glass composition (weight percent):
- $Ga_2O_3$ ----------------------------------------------- 35.3
- $SrO$ -------------------------------------------------- 41.2
- $PbO$ -------------------------------------------------- 23.5

It is found that glasses according to the invention will transmit a substantial proportion of electromagnetic radiations of wavelength 6.5 microns.

The glass whose composition is given in Example 1 above (i.e. 45.8% $Ga_2O_3$, 48.0% SrO, 3.1% $GeO_2$, 3.1% $PbF_2$) will transmit at least 15% of the radiations of wavelength 6.5 microns falling on it, while the glass of Example 2 above (i.e. 28.2% $Ga_2O_3$, 29.6% SrO, 42.2% PbO) will transmit 35% of the radiations of 6.5 microns wavelength falling on it.

We claim:

1. A glass consisting essentially of strontium oxide (SrO) and gallium oxide ($Ga_2O_3$), there being present, by weight, from 0.66 to 1.13 parts of gallium oxide to one part of strontium oxide.

2. A strontium gallate glass having a softening point greater than 650° C. and being capable of transmitting at least 15% of electromagnetic radiations of a wavelength of at least 6.5 microns.

3. Glass containing by weight from 0.66 to 1.13 parts of gallium oxide ($Ga_2O_3$) to one part of strontium oxide (SrO), the said gallium and strontium oxides constituting at least 50 percent by weight of the glass, the balance consisting essentially of materials of the class consisting of compatible oxides, compatible fluorides and mixtures thereof.

4. Glass according to claim 3 which contains up to 45% by weight of lead oxide (PbO).

5. Glass according to claim 3 which contains up to 35% by weight of at least one oxide selected from the group consisting of lithium, sodium, potassium, calcium and magnesium oxides.

6. Glass according to claim 3 which contains up to 40% by weight of at least one oxide selected from the group consisting of copper, zinc, cadmium, lanthanum, titanium, zirconium, thorium, germanium, tantalum, arsenic and antimony oxides.

7. A glass consisting essentially of gallium oxide, strontium oxide and a substance of the class consisting of gallium fluoride, strontium fluoride and mixtures thereof, the gallium and strontium compounds being present in proportions by weight, based on oxides, of 0.66 to 1.13 parts of the gallium compounds to one part of the strontimum compounds.

8. Glass containing at least 50% by weight of gallium oxide, strontium oxide and a compound selected from the group consisting of gallium fluoride, strontium fluoride, and mixtures thereof, the balance being selected from the class consisting of compatible oxides and fluorides, and the gallium and strontium compounds being present in the glass in a weight ratio, based on their oxides, of from 0.66 to 1.13 parts of gallium to one part of strontium.

9. Glass consisting essentially of gallium oxide, strontium oxide and lead oxide, the said gallium and strontium oxides constituting at least 55% by weight of the glass, and the gallium oxide being present in 0.66 to 1.13 parts by weight to one part of strontium oxide.

10. Glass consisting essentially of by weight at least 50% of gallium oxide and strontium oxide, from 0% to 35% of lithium oxide, from 0% to 35% of sodium oxide, from 0% to 35% of potassium oxide, from 0% to 35% of calcium oxide and from 0% to 35% of magnesium oxide, the gallium and strontium oxides being present in a ratio by weight of from 0.66 to 1.13 parts of gallium oxide to one part of stronium oxide.

11. Glass consisting essentially of by weight at least 50% of gallium oxide and strontium oxide and from 0% to 40% of at least one oxide from the group consisting of the oxides of copper, zinc, cadmium, lanthanum, titanium, zirconium, thorium, germanium, tantalum, arsenic and antimony, the gallium and strontium oxides being present in a ratio by weight of from 0.66 to 1.13 parts of gallium oxide to one part of strontium oxide.

12. A method of manufacturing a heat-absorbing glass comprising the step of fusing at a temperature above 1400° C. a batch consisting of the oxides of strontium and gallium, the batch containing by weight from 0.66 to 1.13 parts of gallium oxide to one part of strontium oxide.

13. A method of manufacturing a heat-absorbing glass comprising the steps of heating a batch comprising salts of strontium and gallium so that the said salts decompose to yield the respective oxides in a proportion by weight of from 0.66 to 1.13 parts of gallium oxide to one part of strontium oxide, and fusing the said oxides at a temperature above 1400° C.

References Cited by the Examiner

Jeevaratnam et al.: J. Amer. Cer. Soc., Nov. 1, 1961, "The System $CaO-Ga_2O_3$" (pages 563–566).

TOBIAS E. LEVOW, *Primary Examiner.*